United States Patent [19]

Srivastava

[11] Patent Number: 5,187,568
[45] Date of Patent: Feb. 16, 1993

[54] VIDEO PROCESSOR HAVING IMPROVED CLAMPING SYSTEM FOR COLOR TELEVISION RECEIVERS

[75] Inventor: Gopal K. Srivastava, Arlington Heights, Ill.

[73] Assignee: Zenith Electronics Corporation, Glenview, Ill.

[21] Appl. No.: 770,511

[22] Filed: Oct. 3, 1991

[51] Int. Cl.[5] .......................... H04N 9/77; H04N 9/78
[52] U.S. Cl. ......................................... 358/39; 358/31
[58] Field of Search .................. 358/21 R, 39, 31, 38, 358/40

[56] References Cited

U.S. PATENT DOCUMENTS 4,424,528  1/1984  Karlock ................................ 358/31
4,482,916  11/1984  Acampora ........................... 358/40

FOREIGN PATENT DOCUMENTS 23987  2/1984  Japan ..................................... 358/31

Primary Examiner—Tommy P. Chin

[57] ABSTRACT

A television receiver includes a frequency multiplexed video processor which processes chrominance and luminance signals in response to synchronously detected composite video information. The composite video signal is separated into a plurality of frequency spectra which are individually processed utilizing digital electronic circuitry to achieve high performance and cost effectiveness. A comb filter is operative within one of the processors to provide separation of the luminance and chrominance information within the chrominance signal bandpass to maintain high frequency luminance signal components. A separate processor and bandpass filter are operative to provide separate control of the luminance peaking within the system. Separation of chrominance band signals from the luminance signal prior to video clamping provides a burst-free backporch for improved video clamping in a digital video processor. Conventional luminance and chrominance processing converts the output signals of the multiplexed processor to RGB video signals which are applied to a conventional cathode ray tube display having a conventional deflection system associated therewith.

11 Claims, 5 Drawing Sheets

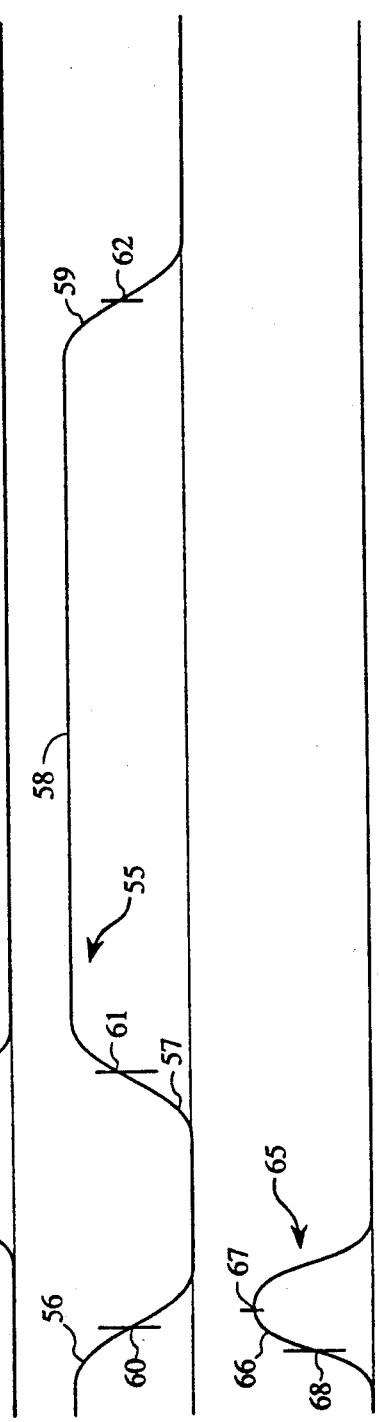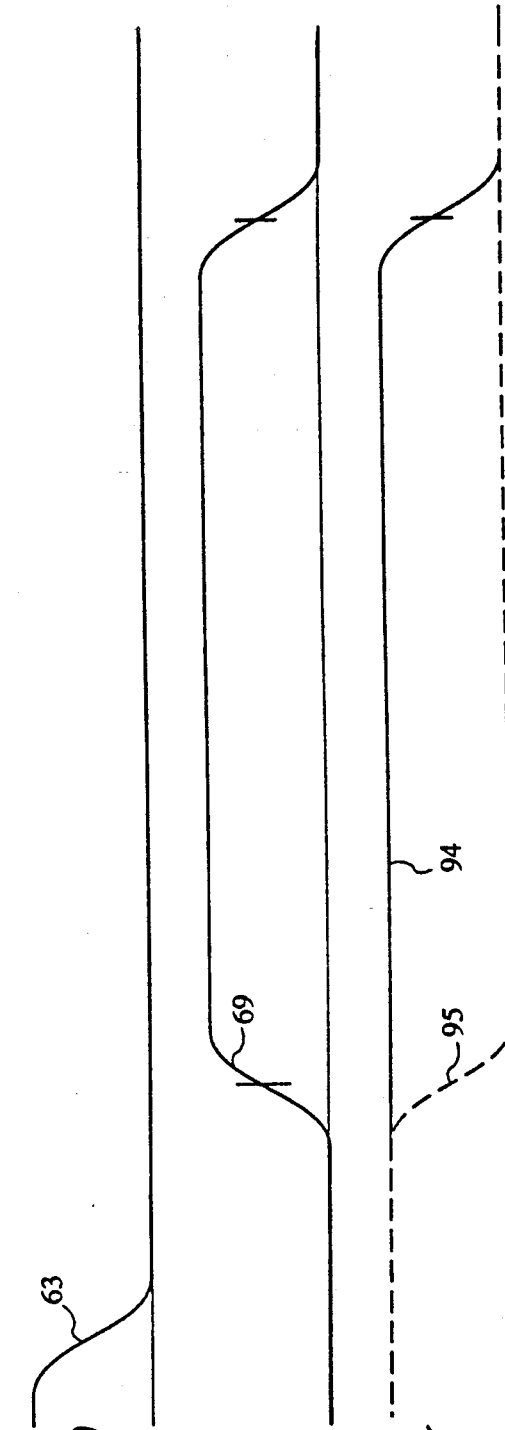

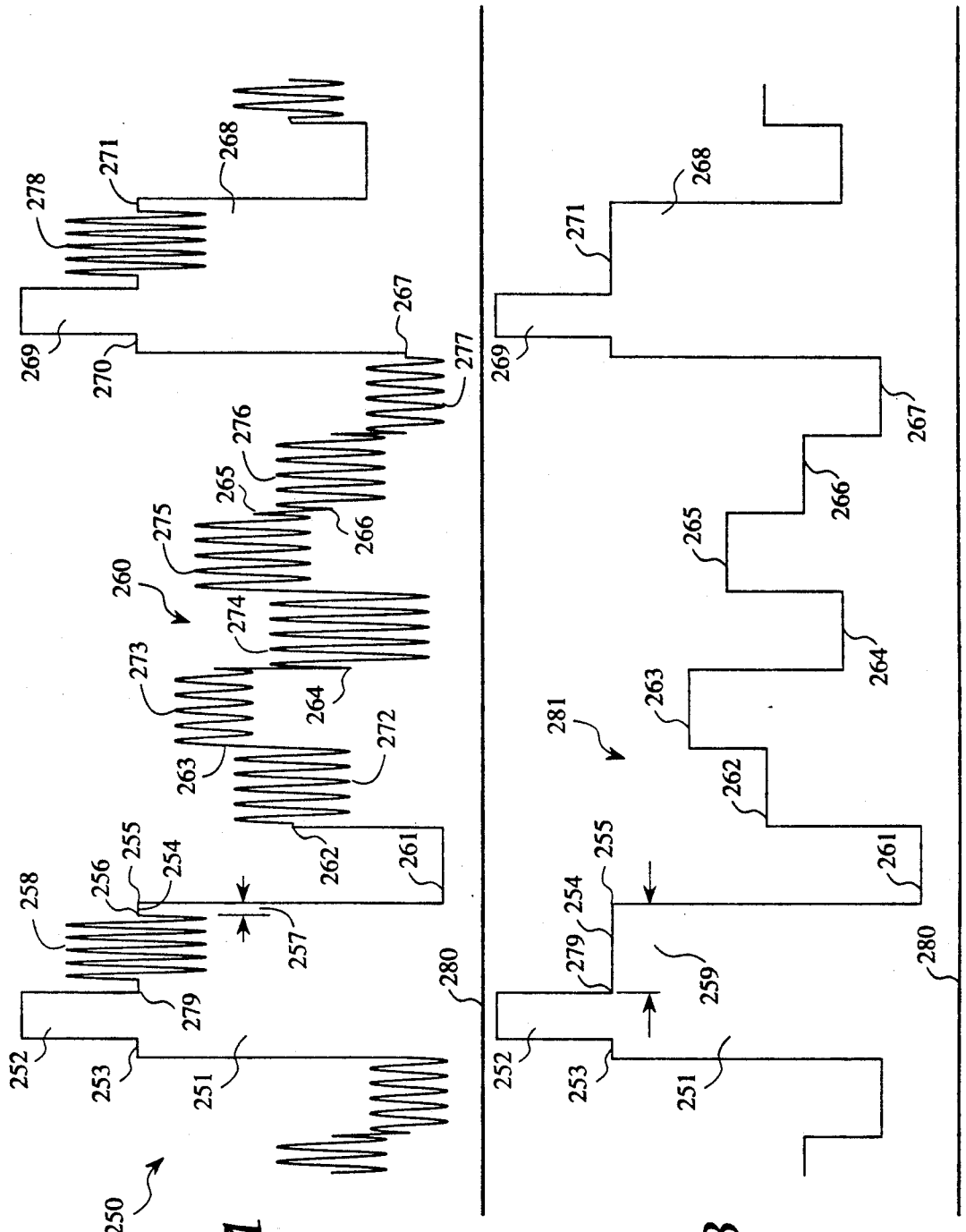

VIDEO PROCESSOR HAVING IMPROVED CLAMPING SYSTEM FOR COLOR TELEVISION RECEIVERS

FIELD OF THE INVENTION

This invention relates generally to television receivers and particularly to the systems therein for processing luminance and chrominance information.

BACKGROUND OF THE INVENTION

Color television systems have been developed using several different broadcast and signal processing formats to achieve the successful transmission and reception of color television programming. While substantial differences between systems exist, they all must satisfy the basic objective of combining the picture or luminance information, the color or chrominance information, and sound information together with appropriate display scan synchronizing signals to form an information signal which may be modulated upon a carrier for transmission. At the receiver, the opposite processes must take place in which the several components of the information signal are separated and appropriately processed. In most television broadcast formats such as the NTSC system used within the United States of America and the PAL system used in many European countries, the signal components corresponding to luminance, chrominance and sound are distinguished from each other and separated for individual processing largely on the basis of signal frequencies.

In the NTSC system, for example, the available broadcast bandwidth is maintained at 6 megahertz. To conserve channel bandwidth and to transmit up to 4.1 megahertz of video signal, a vestigial sideband format in which the carrier is off center within the 6 megahertz channel bandwidth is used. The chrominance information is phase and amplitude modulated and is modulated upon a chrominance subcarrier separated from the picture carrier by approximately 3.58 megahertz. The chrominance modulation system is known as "suppressed carrier" modulation so named because the chrominance information sidebands are transmitted without the chrominance subcarrier itself. To facilitate the regeneration of the chrominance subcarrier at the receiver, a short duration sample of the subcarrier known as the color burst is added to the composite video signal during the horizontal blanking interval following the horizontal sync pulse. The sound information is separated from the picture carrier by 4.5 megahertz. To further conserve channel bandwidth, the luminance signal and chrominance signal share a part of the channel bandwidth.

Thus, a low cost receiver is able to select the chrominance, sound and luminance signal portions by using appropriate frequency response networks or filters and thereafter perform individual processing thereon. Unfortunately, the frequency selection process used in most television receivers results in the loss of substantial amounts of information or image content. Perhaps the most notable loss occurs in the video or luminance information which is severely bandwidth limited as a result of the separation of chrominance information from the luminance information. In most receivers, this separation must be complete even if achieved at the expense of degrading either luminance or chrominance response, or both. While these losses have been recognized as less than desirable, the basic filtering processes used in most television receivers has made improvement difficult or impractical. In attempts to effectively separate chrominance and luminance, many receivers employ an analog glass delay line comb filter to separate luminance and chrominance information from the shared frequency spectrum. Since a glass delay line does not provide accurate delay, factory alignments are needed to accurately separate luminance and chrominance signals, all of which adds greatly to the cost of the receiver.

An alternative approach to television receiver design which promises to improve the recovery of information at the receiver is found in the use of digital signal processing rather than the more pervasive presently used analog signal processing. Several advantages are provided by digital signal processing. For example, the separation of chrominance and luminance information in a digital environment may be carried forward using comb filters which use accurate delay and therefore accurately separate the luminance and the chrominance signals. Effective comb filters are more easily realized in the digital environment. In addition, a variety of information processing techniques which require memory for temporary storage of information are facilitated in a digital environment due to the ease with which memory may be achieved. The result is more effective recovery of the luminance information within the chrominance frequency band.

While the use of sophisticated filtering techniques, such as comb filtering, improves the separation of the chrominance information from the luminance information, additional problems arise as practitioners strive to recover and use a maximum of the luminance information within the television signal. One such problem arises due to the presence of the above-mentioned chrominance burst signal within the horizontal blanking interval. This chrominance burst signal comprises eight to ten cycles of a sample of the chrominance subcarrier used to transmit the chrominance information which is placed shortly after the horizontal sync pulse in a signal portion known as the "back porch". While this location is well-suited to the recovery and separation of chrominance burst for use in the processing of the chrominance information, it is less than desirable in its possible effect upon luminance information processing.

For example, in most television receivers, the DC level for the recovered video signal is established during the horizontal blanking interval of the signal. The establishment of a correct DC level is critical in maintaining accurate luminance display as well as other related functions such as recovery of the scan synchronizing signals. Unfortunately, the back porch portion of the blanking signal is generally the reference level used to establish the correct DC signal component. In most systems, a clamping circuit responds to this back porch level and imposes the required DC component upon the signal.

The problem, however, arises from the fact that the chrominance burst signal occupies much of the back porch making DC clamping difficult and less reliable. This is particularly true in the above-mentioned digital systems which require precise timing to properly sample this small remaining portion of the back porch signal. Also, it is a basic characteristic of digital signal processing that reducing the number of samples used in any sampling operation may correspondingly reduce sample accuracy and reliability. The reliability of sampling a shorten signal portion may be improved through the use of accurate sample timing and faster sample rates. However, this increases system complexity and cost.

There remains, therefore, a need in the art for an improved television signal clamping system which overcomes the problems of chrominance burst signal presence.

Accordingly, it is a general object of the present invention to provide an improved video processor. It is a more particular object of the present invention to provide an improved video processor which effectively establishes the DC component for a composite video signal for television systems having a chrominance burst signal on the clamping reference.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 2A through 2F set forth frequency response curves of several portions of the present invention frequency multiplexed video processor;

FIG. 5A and 5B set forth sample composite video signals within the present invention video processor.

DESCRIPTION OF THE PREFERRED EMBODIMENTS

Figure 1:
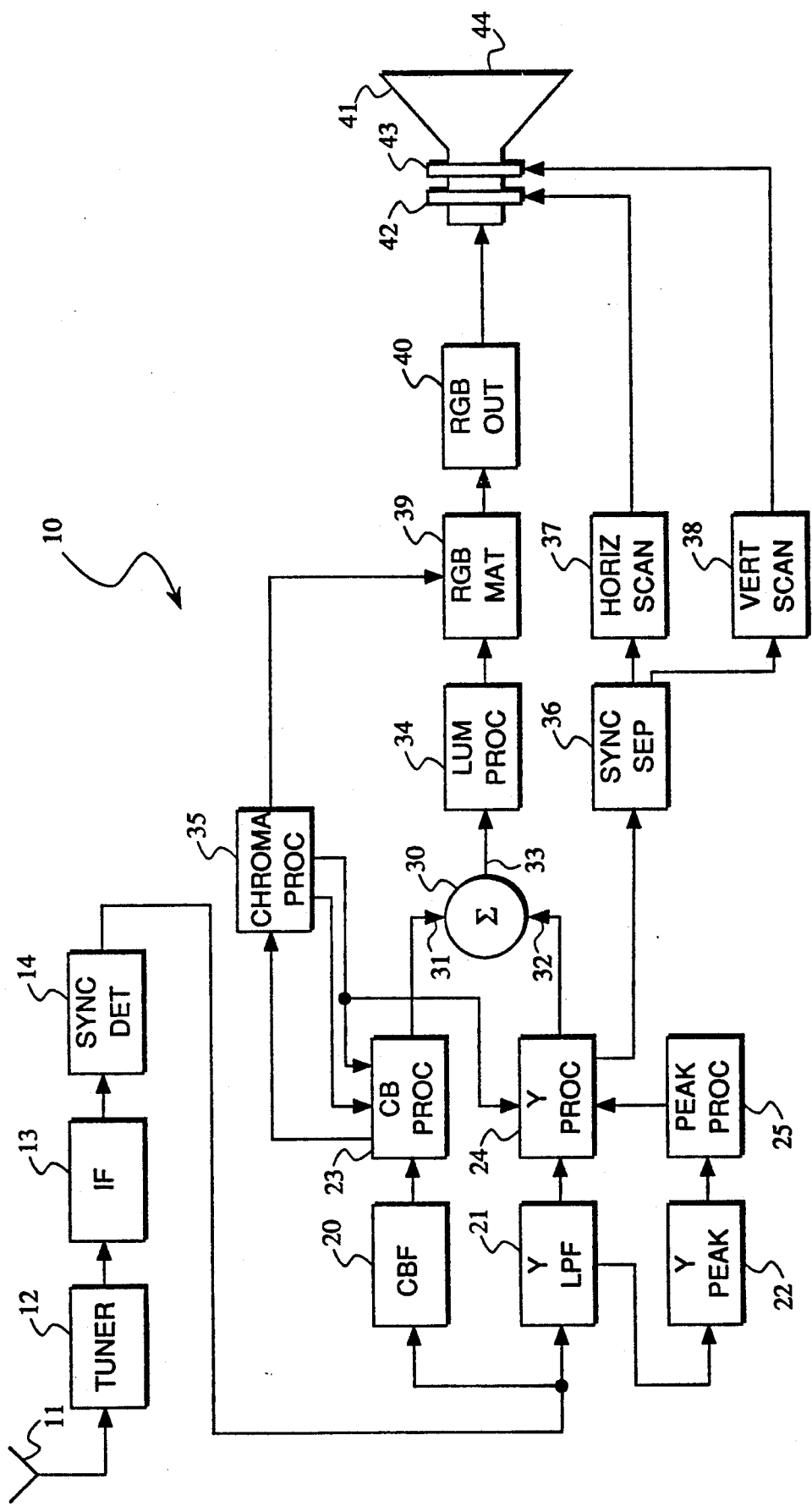
FIG. 1 sets forth a block diagram of a television receiver having a frequency multiplexed video processor constructed in accordance with the present invention.

FIG. 1 sets forth a block diagram of a television receiver constructed in accordance with the present invention and generally referenced by numeral 10. Receiver 10 includes an antenna 11 coupled to a tuner 12. The output of tuner 12 is coupled to an intermediate frequency amplifier 13 which in turn is coupled to a synchronous detector 14. The output of synchronous detector 14 is coupled to frequency selective filters 20 and 21. Filter 21 is further coupled to a filter 22. The output of filter 20 is coupled to a signal processor 23 while the outputs of filters 21 and 22 are coupled to respective signal processors 24 and 25. The output of signal processor 25 is coupled to signal processor 24. Signal processor 23 is coupled to a chrominance processor 35. A summing network 30 includes a pair of inputs 31 and 32 coupled to the outputs of processors 23 and 24 respectively. Summing network 30 further includes an output 33 coupled to the input of a luminance signal processor 34. The latter is coupled to a RGB matrix 39. The output of chrominance processor 35 is also coupled to RGB matrix 39. The output of RGB matrix 39 is coupled to an RGB output circuit 40.

A cathode ray tube 41, constructed in accordance with conventional fabrication techniques, includes a display screen 44 and is coupled to RGB output circuit 40. Cathode ray tube 41 further includes a horizontal deflection yoke 42 and a vertical deflection yoke 43.

Signal processor 24 includes an output coupled to a sync separator 36 which in turn is coupled to a horizontal scan system 37 and a vertical scan system 38. Horizontal scan system 37 is coupled to horizontal yoke 42 while vertical scan system 38 is coupled to vertical deflection yoke 43.

In operation, antenna 11, tuner 12, intermediate frequency amplifier 13 and synchronous detector 14 function in accordance with conventional television system practice to receive a transmitted television signal which is selected by tuner 12 and amplified by intermediate frequency amplifier 13 to a level sufficient to facilitate the operation of synchronous detector 14. The latter performs a synchronous detection process in which the composite video signal which includes the luminance and chrominance as well as the horizontal and vertical synchronizing signals is recovered from the intermediate frequency carrier at the input to synchronous detector 14.

The composite video signal recovered by synchronous detector 14 is applied to filters 20 and 21 and from the latter to filter 22. The frequency responses of filters 20 through 22 are set forth in FIG. 2. With temporary reference to FIGS. 1 and 2 together, FIG. 2A sets forth the response of filter 20 which, in essence, comprises a chrominance signal bandpass filter for an NTSC receiver generally referenced by numeral 50. Thus, frequency response curve 50 defines a passband 51 which is generally centered at the chrominance subcarrier frequency of 3.58 megahertz and which is approximately 1 megahertz wide at the 6 db or "half points" 52 and 53. It will be apparent to those skilled in the art that filter 20 excludes all information within the composite video signal except for the portions thereof having frequencies within response curve 50. In a similar fashion, filter 21 defines a frequency response set forth in FIG. 2B and generally referenced by numeral 55. Response curve 55 defines extended regions 56 and 58 which are pass regions separated by a notch 57 therebetween. Notch 57 is generally coincident with the passband of curves 50 and 65. The 6 db or half points 60 and 61 generally coincide with 6 db points 68 and 53 of curves 67 and 50 in FIG. 2C and 2A respectively. The upper frequency region of response curve 55 defines a slope 59 having a 6 db point 62 at approximately 10 megahertz. Thus, the response curve of filter 21 shown in FIG. 2B essentially passes all frequency components of the composite video signal with the exception of the chrominance bandpass and luminance peaking components. It should also be noted that frequency response 55 of filter 21 is configured to accommodate both NTSC and the newly emerging high definition video signal sources. Accordingly, when used in an NTSC broadcast environment, it will be apparent that very little, if any, luminance information will be contained in the extended frequency portion 58 of curve 55 beyond notch 57.

FIG. 2C sets forth the frequency response of filter 22 generally referenced by numeral 65. As can be seen, response curve 65 shows that filter 22 excludes all frequencies with the exception of a relatively narrow passband 66. Passband 66 is centered at a center frequency 67 which, in the present application, is selected to be 2.5 megahertz. The bandwidth and center frequency of bandpass 66 is, to some extent, a matter of design choice and, as is described below in greater detail, is selected to embrace the portion of the luminance signal which benefits the most from luminance or video peaking processes. It has been found advantageous in the present system to utilize a bandwidth of approximately one-half megahertz for bandpass 66.

Returning to FIG. 1, the filtered output signals of filters 20, 21 and 22 are coupled to a corresponding trio of signal processors 23, 24 and 25 respectively. The operations of processors 23, 24 and 25 are set forth below in greater detail. However, suffice it to note here that processor 23 receives both chrominance and luminance signals within the 3 to 4 megahertz frequency bandwidth and as a result includes the color burst and chrominance signals together with 3 to 4 megahertz frequency luminance information. As is also set forth below in greater detail, processor 23 is operative upon the applied signal to perform a separation of the chrominance information from the luminance information and to perform the automatic chromacontrol, or ACC, function upon the chrominance signal components. The chrominance signal is applied to chrominance processor 35. Concurrently, the luminance signal components separated from the chrominance signal components are coupled to a summing network 30 at input 31. As will be also be described below in greater detail, the operation of processor 23 utilizes advantageous digital processing techniques such as digital comb filtering to efficiently recover the chrominance information without sacrificing the important high frequency luminance information in the 3 to 4 megahertz band which in many prior art television receivers is lost.

Processor 24 essentially processes all of the luminance information with the exception of signal components within the chrominance bandwidth processed by processor 23. Accordingly, processor 24 may be thought of as the primary or main luminance signal processor. As is described below in greater detail, processor 24 performs the important functions of providing a video clamping level and utilizes digital circuitry to provide a precise luminance delay network to match the time delay of the luminance signals from processor 23, prior to addition by summing network 30. In accordance with an important aspect of the present invention, the output of processor 24 includes luminance information having frequencies from 0 to 3 megahertz and from 4 to 11 megahertz but is free of any chrominance information. The output of processor 24 is coupled to input 32 of summing network 30.

Processor 25 is configured to provide supplemental luminance signal processing and is intended to provide the desired luminance signal peaking. The operation of processor 25, therefore, is extremely important to the overall quality and appeal of the displayed image of receiver 10. As is known, the use of luminance signal peaking techniques in which the luminance signal components at significant transition points are emphasized enhances the displayed image. Essentially, the operations of peaking systems provide emphasized preshoot and overshoot components adjacent the luminance signal transitions to sharpen the displayed image and provide a "crisper" display. Processor 25 performs this function in the manner set forth below by separately amplifying the luminance signal components used in luminance peaking. This enhanced peaking signal is coupled to processor 24 and, in the manner set forth below in greater detail, is combined with the luminance signal processed thereby.

Summing network 30 combines the luminance information from processors 23 and 24 to provide a full spectrum luminance signal at output 33 which is applied to luminance processor 34. It should be noted that in accordance with an important aspect of the present invention described below in greater detail, the frequency multiplexing of the present invention system provides for complete recovery of the entire spectrum of luminance frequencies while nonetheless efficiently separating the chrominance signal. In addition, the separation and processing of the peaking frequency luminance signal components for supplemental amplification provides improved image enhancement due to higher quality luminance peaking. Luminance processor 34 provides further amplification and processing of the luminance signal for application to RGB matrix 39.

Similarly, chrominance processor 35 is operative in accordance with conventional receiver techniques to recover the color difference signals from the chrominance input from processor 23. The output color difference signals from processor 35 are also applied to RGB matrix 39. Matrix 39 is constructed in accordance with conventional fabrication techniques and, in essence, combines the color difference signals from chrominance processor 35 with the luminance signal from processor 34 to produce RGB color video signals which are amplified by output amplifier 40 and applied to cathode ray tube 41 in further accordance with conventional processing techniques.

Sync separator 36 receives a luminance signal output from processor 24 and separates the horizontal and vertical scan synchronizing signals therefrom which are used to synchronize the operations of horizontal and vertical scan systems 37 and 38 and provide energizing signals for horizontal and vertical yokes 42 and 43 respectively.

Figure 3:
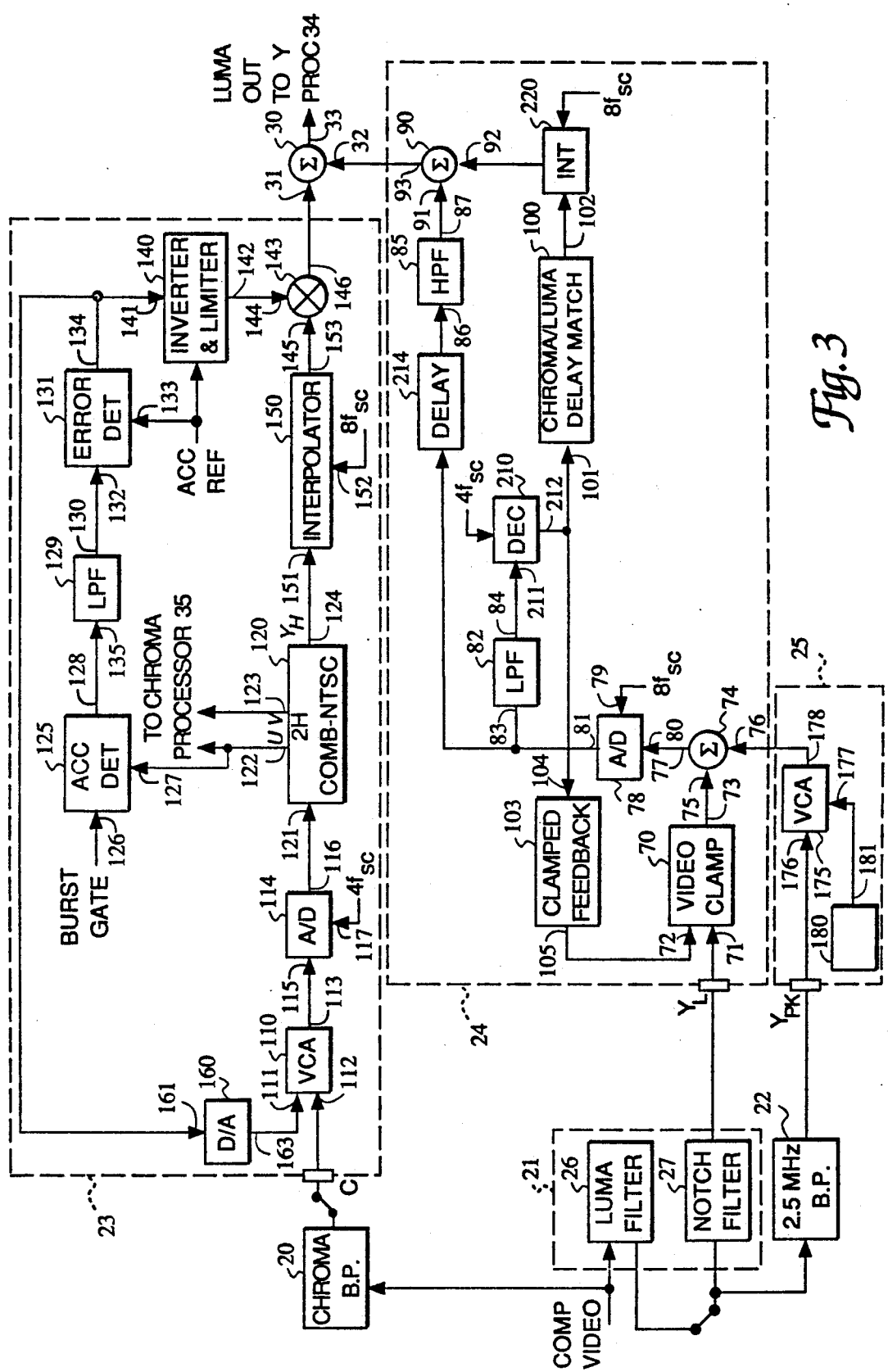
FIG. 3 sets forth a block diagram of the present invention frequency multiplexed video processor.

FIG. 3 sets forth a detailed block diagram of processors 23, 24 and 25 constructed in accordance with the present invention. Also shown in FIG. 3 are input filters 20, 21 and 22. As mentioned above in FIG. 1, the composite video output signal from synchronous detector 14 which includes luminance, chrominance, chrominance burst and synchronizing information signals is applied commonly to filters 20 and 21. Filter 21 includes two filter stages 26 and 27 serially coupled between synchronous detector 14 (shown in FIG. 1) and processor 24 and defines the above-mentioned frequency response shown in FIG. 2B which generally excludes chrominance and luminance peaking information. In accordance with an important aspect of the present invention, luminance filter 26 excludes information between three and four megahertz. As a result, the output of filter 26 is substantially free of chrominance information and, more importantly, chrominance burst. This "chrominance free" signal is coupled to a notch filter 27 and a bandpass filter 22. Bandpass filter 11 passes the video peaking signal components near two and a half megahertz while notch filter 27 defines a complimentary response to bandpass filter 22.

Processor 24 includes a video clamp circuit 70 having an input 71 coupled to notch filter 27, an input 72, and an output 73. The latter is coupled to an input 75 of a summing network 74. An analog-to-digital converter 78 includes an 8fsc clock signal input 79, an input 80 coupled to output 77 of summer 74 and an output 81. A highpass filter 85, having a frequency response set forth in FIG. 2E, includes an input 86 coupled to output 81 of analog-to-digital converter 78 and an output 87 coupled to input 91 of a summing network 90. A low pass filter 82 having a frequency response corresponding to response curve 63 in FIG. 2D includes an input 83 coupled to output 81 of analog-to-digital converter 78 and an output 84. A clamp feedback circuit 103 includes an input 104 coupled to output 84 of low pass filter 82 and an output 105 coupled to input 72 of video clamp 70. A delay line network 100 includes an input 101 coupled to output 84 of low pass filter 82 and an output 102 coupled to input 92 of summing network 90. The summing network 90 includes an output 93 coupled to input 32 of summing network 30. Delay line 100 provides a delay equal to the required chrominance/luminance time difference plus a one horizontal line delay. The latter is needed to compensate for the one horizontal line delay introduced into the signals processed by the two horizontal line network of comb 120.

Processor 23 includes a gain controlled amplifier 110 having an input 112 coupled to filter 20, a control signal input 111, and an output 113. An analog-to-digital converter 114 includes an input 115 coupled to output 113 of amplifier 110, a clock signal input 117 coupled to a clock signal source having a frequency four times the chrominance subcarrier or "4fsc" (not shown) and an output 116. A two horizontal line NTSC comb filter 20 includes an input 121 coupled to output 116 of analog to digital converter 114, a pair of chrominance signal outputs 122 and 123, and a luminance signal output 124. A digital interpolator 150 includes an input 151 coupled to luminance output 124 of comb filter 120, a clock signal input 152 coupled to a clock signal source having a frequency eight times the chrominance subcarrier or "8fsc" (not shown), and an output 153. The latter is coupled to an input 145 of a multiplier network 143. Multiplier network 143 further includes an input 144 and an output 146 with the latter being coupled to input 31 of summing network 30. An automatic chrominance control detector 125 includes an input 126 coupled to a source of burst gating pulse (not shown), an input 127 coupled to output 122 of comb filter 120, and an output 128. A low pass filter 129 includes an input 135 coupled to output 128 of detector 125 and an output 130. An error detector 131 includes an input 132 coupled to output 130 of filter 129, a reference input 133 coupled to a source of ACC reference potential (not shown), and an output 134. An inverter and limiting circuit 140 includes an input 141 coupled to output 134 and an output 142 coupled to input 144 of summing network 143. A digital-to-analog converter 160 includes an input 161 coupled to output 134 of error detector 131 and an output 163 coupled to control input 111 of gain controlled amplifier 110.

Processor 25 includes a gain controlled amplifier 175 which includes an input 176 coupled to filter 22, a gain control input 177, and an output 178 coupled to input 76 of summing network 74. A source of gain control voltage 180 includes an output 181 coupled to gain control input 177 of gain controlled amplifier 175.

In operation and by way of overview, the circuit of FIG. 3 provides frequency multiplexed luminance and chrominance processing in which processor 24 may be regarded as the primary luminance signal processor processing luminance and sync information free of chrominance and chrominance burst information. Conversely, processor 23 processes the chrominance and chrominance burst portions of the applied composite video signal together with the luminance signal components found within the frequency bandwidth of the chrominance signal. Finally, processor 25 is dedicated to the separate processing of the luminance signal components which correspond to luminance transition peaking. The influence of the peaking components may be independently controlled without upsetting the characteristics of the remaining luminance signal component processing.

With respect to the operation of processor 24, it should be recalled that the composite video signal applied to filter 21 is subjected to the frequency response of filter 21 which includes filter sections 26 and 27. As a result, the signal applied to clamp circuit 70 has a frequency characteristic shown in FIG. 2B as curve 55 which may be generally characterized as the luminance signal frequencies above and below the chrominance bandpass frequency together with the scan synchronizing signals. Notch filter 27 provides attenuation of signal components at 2.5 megahertz. Since the signal at input 71 does not contain chrominance or chrominance burst information, the blanking pulse back porch is clear which permits video clamp 70 to operate in a more efficient manner in establishing the appropriate reference level for the luminance signal. In essence, removal of chrominance burst permits video clamp 70 and clamp feedback 103 to sample the entire back porch of the horizontal blanking signal.

With temporary reference to FIGS. 5A and 5B, the effect of chrominance burst removal upon video clamping may be better understood. FIG. 5A sets forth an NTSC composite video signal as it would appear prior to filter 2b while FIG. 5B sets forth the same composite video signal after filtering by filter 26. It will be apparent, however, that the waveforms shown in both FIGS. 5A and 5B are "idealized" and intended solely to illustrate the effect of filter 26 in removing the chrominance and chrominance burst information.

With specific reference now to FIG. 5A, a composite video signal is shown generally referenced by numeral 250. Waveform 250 is shown for approximately one horizontal scan interval. Thus, waveform 250 includes a pair of successive horizontal blanking pulses 251 and 268 which in turn include respective horizontal sync pulses 252 and 269. Blanking pulse 251 includes a front porch 253 and a back porch 254. The latter includes a chrominance burst signal 258. Similarly, blanking pulse 268 includes a front porch 270, a back porch 271 and a chrominance burst 278.

For purposes of illustration, waveform 250 also includes a simple "color bar" type signal generally referenced by numeral 260. Color bar 260 defines a succession of luminance levels 261 through 267. Luminance level 261 is shown without a chrominance component while luminance levels 262 through 267 each include chrominance components 272 through 277 respectively.

Of particular importance to the present invention, waveform 250 shows that chrominance burst 258 occupies most of back porch 255. As a result, the portion of back porch 254 from the end of burst at point 256 to the end of blanking pulse 251 at point 255 defines an interval 257 which, but for the present invention system, would be available for the luminance clamping function. As can be seen, the duration of interval 257 provides a small fraction of back porch 254.

In contrast, FIG. 5B sets forth a composite video waveform 281 following the filtering action of luminance filter 26. As a result of the exclusion of chrominance and chrominance burst information by luminance filter 26, chrominance components 272 through 277 as well as chrominance burst signals 258 and 278 are absent. The latter is particularly important to the present invention in that virtually the entire interval 259 of back porch 254 is available for use in video clamping action.

Returning to FIG. 3, the filtered output of filters 26 and 27 is coupled to video clamp 70 and thereafter the clamped luminance signal from clamp 70 is combined with the enhanced peaking signal from amplifier 175 by summing network 74 and converted from an analog signal to a digitally encoded signal by converter 78. To maintain the maximum amount of the all-important high frequency luminance signal components within the converted signal, analog-to-digital converter 78 is operated in response to a clock signal input having a relatively high frequency. While the frequency of clock signal used is, to some extent, a matter of design choice, it has been found convenient in the present system to utilize a clock signal having a frequency eight times that of the chrominance subcarrier. The digital signal produced by converter 78 is filtered by a digital low pass filter 82 having a frequency response corresponding generally to response curve 63 in FIG. 2D. The low frequency signal components passed by filter 82 are applied to a decimator in which the digital signal data rate is down converted from 8fsc to 4fsc afterwhich it is coupled to clamp feedback circuit 103 which processes the digitally encoded low frequency luminance signals to provide a DC feedback input for clamp 70. The function of clamped feedback circuit 103 is to sample the back porch portion of the blanking pulse and provide a corresponding digital number which is used to establish the correct DC level within the output signal of video clamp 70. In accordance with an important aspect of the present invention, virtually the entire back porch may be sampled to provide a reliable result. Because of the conversion to a digitally encoded signal provided by converter 78, delay matching network 100 may be correspondingly constructed using digital circuit techniques. The data rate reduction of the digital luminance signal produced by decimator 210 facilitates a considerable reduction in this size of delay matching network 100. As mentioned above and in accordance with an important aspect of the present invention, the provision of precise delay of the luminance signal within processor 24 is greatly facilitated in the digital signal environment. The delay of the wider bandwidth luminance signal is required in receivers such as receiver 10 to compensate for the delays associated with the narrow band processing of the chrominance signal and the luminance signal (3 to 4 megahertz), and for the delays in the comb filter and the interpolator. As mentioned above, comb filter 120 is in its preferred form, a two horizontal line comb. While this improves its performance, the two line structure introduces a horizontal line delay which must be compensated within the remainder of the luminance processor. Accordingly, the delay provided by delay network 100 includes this additional horizontal line delay. The digital processing within delay network 100 facilitates the provision of such delays and ensures precise coincidence of the luminance and chrominance signals in the displayed image and enhances overall image quality.

The delayed luminance signal is combined with the remainder of the luminance signal filtered by highpass filter 85, and delayed by delay match 214, within summing network 90. Highpass filter 85 defines a frequency characteristic corresponding to response curve 69 in FIG. 2E and is operative to exclude the low frequency video components selected by low pass filter 82. This exclusion of lower frequency luminance components is necessary to ensure that all low frequency luminance signal components are subjected to the delay within delay network 100. The separation of low frequency and high frequency signal paths facilitates the use of a considerably reduced size delay network because the lower frequency luminance signal can be down converted to a slower data rate of 4fsc by decimator 210 before processing by delay 100 and thereafter up converted by interpolator 220 back to an 8fsc data rate prior to application to summing network 90. In addition, it should be noted that the input signals to summing network 90 are digitally encoded signals. Thus, summing network 90 should be understood to include a conventional digital signal adder. The digitally encoded combined signal at the output of summing network 90 is applied t summing network 30 which also comprises a digital signal adder. Thus, processor 24 provides the all important luminance processing operations of proper video clamping together with the imposition of a precise luminance signal delay while maintaining the frequency response shown in FIG. 2B. As a result, the output signal of processor 24 maintains all of the luminance signal components of the input signal within the response shown in FIG. 2B and further includes the enhanced or emphasized luminance peaking signals provided by processor 25. In essence, then, the output signal of processor 24 includes all luminance signals but for those falling within the chrominance signal bandwidth. One important function of processor 23 is to provide the remaining luminance components to complete the luminance signal and provide a full spectrum response.

Turning now to the operation of processor 23, it should be recalled that the input signal to processor 23 comprises the composite video signal from synchronous detector 14 filtered by bandpass filter 20 in accordance with the frequency response shown in FIG. 2A. Thus, the input signal to gain controlled amplifier 110 includes the chrominance and luminance signal information falling within the bandpass shown in FIG. 2A. As is described below in greater detail, gain controlled amplifier 110 has a variable signal gain which, in essence, operates to maintain a constant signal output level for processor 23. Thus, gain controlled amplifier 110 amplifies the applied luminance and chrominance signals and couples them to analog-to-digital converter 114. The signal applied to converter 114 does not include the higher frequency signal components which are applied to converter 78 within processor 24. As a result, a lower frequency clock signal may be utilized which permits the use of a considerably smaller two horizontal line network for comb filter 120. Accordingly, it has been found convenient to utilize a clock signal input to converter 114 having a frequency four times the chrominance subcarrier frequency. Converter 114 operates in accordance with conventional processes to convert the applied analog signal to a corresponding digitally encoded signal which is applied to comb filter 120. It should be recalled that the digitally encoded signal at the output of converter 114 includes both chrominance and luminance signals within the bandpass response of filter 20. Comb filter 120 comprises a digital comb filter which is extremely efficient at separating the luminance and chrominance information from the applied input without sacrificing the important luminance components. As a result, substantial advantage in the efficiency and effectiveness of the present invention system is achieved by the use of digitally encoded signal processing within processor 23. The separated chrominance signal components are coupled to chrominance processor 35 as described above.

It should be noted that while considerable reduction of complexity and economy is realized due to the use of a slower sampling rate in analog-to-digital converter 114 which in turn facilitates the use of a smaller two horizontal line comb network. However, because the resulting luminance signal at output 124 of comb filter 120 is a digitally encoded signal having a lower clock rate than that used in processor 24, the combination of the lower clock rate luminance signal output of comb filter 120 with the higher clock rate luminance signal provided by processor 24, requires the use of interpolator 150 interposed between the luminance signal output of comb filter 120 and summing network 30. Thus, interpolator 150 is operative in response to the same clock signal input utilized by analog-to-digital converter 78 within processor 24. Interpolator 150 functions in accordance with conventional fabrication techniques to convert the slower clock signal output of comb filter 120 to the higher clock signal rate or data rate of the applied clock signal at input 152 thereof. The use of lower frequency converter 114 and interpolator 150 achieves an overall economic advantage in that the two horizontal line memory comb filter 120 will require half as much memory than if the clock rate was twice as fast, because with faster sample rate, the number of video samples in the horizontal line will be higher.

The chrominance output signal of comb filter 120 is further processed by a conventional automatic chrominance control, or ACC, loop formed by ACC detector 125, low pass filter 129 and error detector 131. In accordance with conventional processing techniques, the burst gate pulse applied to detector 125 permits the separation of the reference chrominance signal burst from the remainder of the signal which is then amplitude detected by detector 125 and averaged by low pass filter 129 and compared to a predetermined reference number by detector 131. The output of detector 131 is an amplitude correction signal which is fed back to voltage controlled amplifier 110 through a digital-to-analog converter 160. The use of digital-to-analog converter 160 is required because voltage controlled amplifier 110 is an analog device which responds to an input analog control signal. The resulting operation of the control loop thus formed maintains a substantially constant chrominance signal output level for use by chrominance processor 35.

As a consequence of the operation of the automatic chrominance control or ACC loop within processor 23, a correspondingly constant amplitude is maintained for the luminance signal components which are concurrently amplified by gain controlled amplifier 110. It has been found desirable not to increase the amplitude of the luminance components of the video information in the range of three to four megahertz. Therefore, any increase of these luminance components due to automatic chrominance control action in response to chrominance reference burst decreases is compensated for by the action of multiplier 143. This compensation is accomplished by inverting the chrominance correction signal and applying it to multiplier 143 at input 144. The luminance signal at the output of multiplier 143 is reduced by this inverted correction signal which compensates for the increase caused by the automatic chrominance control amplifier (VCA 110). As a result, luminance signals within the three to four megahertz range are processed using the full dynamic range of analog-to-digital converter 114 while remaining unaffected by the action of the automatic chrominance control system. The negative going chrominance control signal is limited by inverter and limiter 140. As a result, gain reductions implemented by VCA 110 within the automatic chrominance control system which cause reductions of the luminance signal are not compensated for by multiplier 143 since such reductions are not visibly degrading to the displayed luminance signal. The luminance signal output from multiplier 143 is applied to summing network 30. Summing network 30 is also a digital adder combining the luminance signal outputs of processors 23 and 24 to provide a full spectrum luminance signal output which is coupled to luminance processor 34 (seen in FIG. 1).

It will be apparent to those skilled in the art that the present invention system shown in FIG. 3 provides substantial advantages over the prior art systems. The use of frequency multiplexing between processors 23, 24 and 25 permits individual attention to each component of the luminance and chrominance signal frequency spectra and facilitates the use of the entire blanking pulse back porch to achieve accurate and reliable video clamping. The use of digital signal processing within the present invention system achieves substantial economy of operation as well as improved performance. The resulting combined luminance signal applied to luminance processor 34 is shown in FIG. 2F as response curve 94. With temporary reference to FIG. 2F, it should also be noted that dashed line curve 95 represents the effective overall response of the present invention system to an applied NTSC composite video signal. The difference between response curve 95 and the overall response curve of the system 94 is the result of frequency limitations within the NTSC broadcast standard itself and not the present invention system. Thus, in accordance with an important advantage, the present invention system is fully capable of providing the full spectrum response required by newly emerging sources of high resolution television signals.

Figure 4:
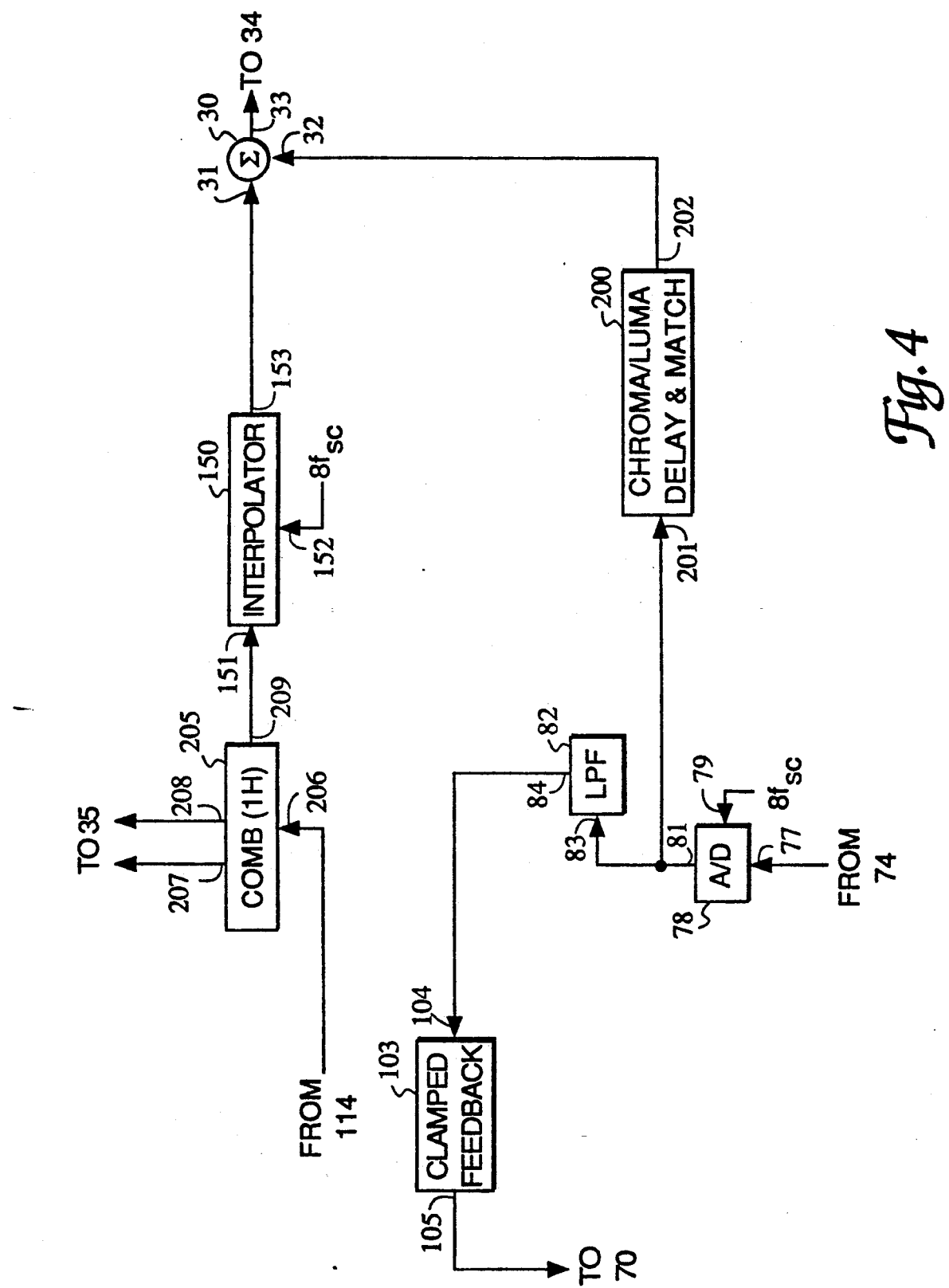
FIG. 4 sets forth a block diagram of an alternate embodiment of the present invention frequency multiplexed video processor.

FIG. 4 sets forth an alternate embodiment of the present invention which is generally the same as the embodiment shown in FIG. 3 with the exception of the use of a smaller comb filter 205 in place of comb filter 120 in the embodiment of FIG. 3. In addition, the embodiment shown in FIG. 4 utilizes a correspondingly smaller delay network 200 in place of delay network 100 and eliminates highpass filter 85 and summing network 90. The remainder of the embodiment shown in FIG. 4 is identical t the embodiment shown in FIG. 3.

Specifically, analog-to-digital converter 78 includes an input 77 coupled to summing network 74, a clock input 79 and an output 81. Low pass filter 82 includes an input 83 coupled to converter 78 and an output 84 coupled to input 104 of clamp feedback circuit 103. The output of converter 78 is further coupled to an input 201 of a delay network 200. Delay network 200 includes an output 202 coupled directly to input 32 of summing network 30. A one horizontal line comb filter 205 includes an input 206 coupled to analog-to-digital converter 114 (seen in FIG. 3). Comb filter 205 further includes chrominance outputs 20 and 208 coupled to chrominance processor 35 (seen in FIG. 1) and a luminance output 209 coupled to input 151 of interpolator 150. The output of interpolator 150 is coupled to input 31 of summing network 30 in the same manner as set forth in FIG. 3. In further accordance with the embodiment of FIG. 3, the output of summing network 30 is coupled to luminance processor 34 (shown in FIG. 1).

The embodiment of FIG. 4 is configured to facilitate the use of a smaller comb filter 205 having a size corresponding to one horizontal line of information. Accordingly, the one horizontal line structure of comb filter 205 does not introduce the additional horizontal line delay experienced by the two horizontal line comb structure of comb 120 used in the embodiment of FIG. 3. Accordingly, delay network 200 is not required to provide a compensating horizontal line delay and thus comprises a substantially smaller delay network having sufficient delay to provide the required chrominance/luminance time delay. As a result, the luminance output signal from converter 78 need not be separately filtered in the manner provided by filters 82 and 85 in the embodiment of FIG. 3 but may instead be applied directly to input 201 of delay network 200. With the elimination of separate processing through filters 82 and 85 in the manner shown in the embodiment in FIG. 3, the embodiment of FIG. 4 no longer requires summing network 90 and thus the output of delay network 200 may be applied directly to summing network 30. Low pass filter 82 is maintained in the feedback path from converter 78 to clamped feedback network 103 to maintain the desired frequency response of the video clamping network. This embodiment also does not require decimator 210 and interpolator 220 shown in FIG. 3.

Thus, it will be apparent from the examination of FIG. 4 that substantial economy has been obtained in comparison to the embodiment of FIG. 3 by the use of a smaller comb filter, a smaller delay network and the elimination of highpass filter 85, decimator 210, interpolator 220 and summing network 90. Despite the reduced cost of the embodiment shown in FIG. 4 with respect to the embodiment of FIG. 3, however, many of the performance advantages of the present invention system are retained including the frequency multiplexing which provides the individual processing of the luminance signal within the chrominance band, the luminance peaking frequencies, and the extended luminance frequencies processed by processor 24. Thus, the embodiment of FIG. 4, in essence, practices the present invention in a lower cost manner.

What has been shown is a cost effective, efficient and high performance digital video processor for use in a television receiver, computer monitor or other similar processing system. The system utilizes a combination of frequency multiplexing together with sophisticated and cost effective digital electronic circuit processing techniques to provide a high performance processor at a cost effective price which includes a reliable and effective video clamping system.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in an image display system responsive to a composite video signal having periodic blanking signals each defining a reference back porch and periodic sync pulses, chrominance burst signals imposed upon said reference back porch chrominance information within a chrominance band and luminance information including chrominance band luminance information within said chrominance band, video processing means comprising:
   means for receiving said composite video signal;
   means for selecting a portion of said composite video signal to remove said chrominance burst signals therefrom and derive and altered substantially burst-free video signal;
   means for converting said altered substantially burst-free video signal to a digitally encoded altered substantially burst-free video signal at a first data rate;
   means for sampling said digitally encoded altered substantially burst-free video signal during said reference back porch to produce a clamping reference; and
   means for clamping said altered substantially burst-free video signal at a DC clamping level in response to said clamping reference to produce a clamped altered substantially burst-free video signal.

2. Video processing means as set forth in claim 1 wherein said means for selecting includes means for filtering said composite video signal.

3. Video processing means as set forth in claim 2 wherein said means for filtering includes:
   means for frequency selecting the portions of said composite video signal which have frequencies outside said chrominance band.

4. Video processing means as set forth in claim 3 further including:
   means for recovering said chrominance information and said chrominance band luminance information;
   means for separating said chrominance band luminance information and chrominance information within said chrominance band; and
   means for combining said chrominance band luminance information within said chrominance band with said clamped altered substantially burst-free video signal.

5. Video processing means as set forth in claim 4 further including:
   means for low pass filtering said digitally encoded altered substantially burst-free video signal; and
   means for down converting said digitally encoded altered substantially burst-free video signal to a second data rate slower than said first data rate.

6. For use in an image display system responsive to a composite video signal having periodic blanking signals each defining a reference back porch and periodic sync pulses, chrominance burst signals imposed upon said reference back porch chrominance information within a chrominance band and luminance information including chrominance band luminance information with said chrominance band, a video processing method comprising the steps of:
   receiving said composite video signal;
   selecting a portion of said composite video signal to remove said chrominance burst signals and derive and altered substantially burst-free video signal;
   converting said altered substantially burst-free video signal to a digitally encoded altered substantially burst-free video signal at a first data rate;
   sampling said digitally encoded altered substantially burst-free video signal during said reference back porch to produce a clamping reference; and
   clamping said altered substantially burst-free video signal at a DC clamping level in response to said clamping reference to produce a clamped altered substantially burst-free video signal.

7. A video processing method as set forth in claim 6 wherein said selecting step includes the step of filtering said composite video signal.

8. A video processing method as set forth in claim 7 wherein said filtering step includes frequency selecting the portions of said composite video signal which have frequencies outside said chrominance band.

9. A video processing method as set forth in claim 8 further including the steps of:
 recovering said chrominance information and said chrominance band luminance information;
 separating said chrominance band luminance information and chrominance information within said chrominance band; and
 combining said chrominance band luminance information within said chrominance band with said clamped altered substantially burst-free video signal.

10. A video processing method as set forth in claim 9 further including the steps of:
 low pass filtering said digitally encoded altered substantially burst-free video signal; and
 down converting said digitally encoded altered substantially burst-free video signal to a second data rate slower than said first data rate.

11. A video processor for use in a color television receiver comprising:
 a source of composite video signal having luminance and chrominance signals, scan synchronizing signals, blanking interval signals defining a reference back porch and chrominance burst signals modulated upon said reference back porch;
 a chrominance burst frequency filter coupled to said source of composite video signal excluding said chrominance burst signals;
 a video clamp circuit having a composite video input coupled to said chrominance burst frequency filter, a clamp signal input, and an output having a DC level responsive to said clamp signal input;
 an analog-to-digital converted coupled to said output of said video clamp circuit; and
 a clamp feedback having an input coupled to said analog-to-digital converter sampling the output signal thereof to produce a clamp signal and an output coupled to said clamp signal input of said video clamp.

* * * * *